(12) United States Patent
Cohen et al.

(10) Patent No.: US 12,399,744 B2
(45) Date of Patent: Aug. 26, 2025

(54) EDGE-CASE RESOLUTION IN ARTIFICIAL INTELLIGENCE SYSTEMS

(71) Applicant: SparkAI Inc., White Plains, NY (US)

(72) Inventors: Eyal Cohen, San Francisco, CA (US); Michael Moshe Kohen, Miami Beach, FL (US); Murat Ocalan, New York, NY (US); Nicholas C. Francescani, Lakewood, OH (US)

(73) Assignee: SparkAI Inc., White Plains, NY (US)

( * ) Notice: Subject to any disclaimer, the term of this patent is extended or adjusted under 35 U.S.C. 154(b) by 485 days.

(21) Appl. No.: 17/968,748

(22) Filed: Oct. 18, 2022

(65) Prior Publication Data

US 2023/0117221 A1    Apr. 20, 2023

Related U.S. Application Data

(60) Provisional application No. 63/257,050, filed on Oct. 18, 2021.

(51) Int. Cl.
*G06F 9/50* (2006.01)

(52) U.S. Cl.
CPC ................ *G06F 9/5027* (2013.01)

(58) Field of Classification Search
CPC ...................................... G06F 9/5072
See application file for complete search history.

(56) References Cited

U.S. PATENT DOCUMENTS

| | | | |
|---|---|---|---|
| 11,636,420 B2* | 4/2023 | Todd | G06Q 10/083 705/7.42 |
| 2009/0037557 A1* | 2/2009 | Seger | G06F 11/30 709/217 |
| 2017/0061351 A1* | 3/2017 | Lee | G06Q 40/03 |
| 2017/0177417 A1* | 6/2017 | Herbert | G06F 11/3409 |
| 2021/0136095 A1 | 5/2021 | Dinh et al. | |
| 2023/0070218 A1* | 3/2023 | Al-Baiyat | E21B 47/09 |

FOREIGN PATENT DOCUMENTS

| | | |
|---|---|---|
| CN | 110135273 A | 8/2019 |
| CN | 112769796 B | 10/2021 |

OTHER PUBLICATIONS

European Patent Office, "International Search Report and Written Opinion," issued in related International Patent Application No. PCT/US2022/047065 mailed Jan. 13, 2023 (13 pages).

* cited by examiner

*Primary Examiner* — Charlie Sun
(74) *Attorney, Agent, or Firm* — Young Basile Hanlon & MacFarlane, P.C.

(57) ABSTRACT

Devices, systems, and methods are directed to efficient and robust resolution of edge-cases encountered by artificial intelligence systems in physical environments. In one aspect, a method may include receiving event data from a client application programming interface (API) associated with an intelligent software agent at least partially controlling an endpoint in an environment, the event data representing an edge-case encountered by the endpoint, identifying one or more tasks based on the event data, providing each task to a respective user interface of at least one user client, receiving, from a respective user interface of each user client, user input associated with each task provided to the at least one user client, based on the user input, determining a remedial action, and sending the remedial action to the client API to initiate resolution of the edge-case by the intelligent software agent at least partially controlling the endpoint in the environment.

20 Claims, 5 Drawing Sheets

EDGE-CASE RESOLUTION IN ARTIFICIAL INTELLIGENCE SYSTEMS

CROSS-REFERENCE TO RELATED APPLICATIONS

This application claims priority to U.S. Provisional Application 63/257,050, filed Oct. 18, 2021, the entire contents of which are hereby incorporated herein by reference.

BACKGROUND

Artificial intelligence has many uses in automating workflows. In particular, artificial intelligence has many applications for controlling movement of various types of objects to perform tasks in physical environments. The use of artificial intelligence to control movement of such objects can, however, be challenging in real-world scenarios. For example, in dynamic environments, an artificial intelligence system can encounter edge-cases, which includes conditions in the environment that are infrequent, evanescent, and/or unusual. While training data can be used to train an artificial intelligence system to deal with common situations, training the artificial intelligence system to deal with the unpredictable nature of edge-cases generally requires a prohibitive amount of training data. Thus, edge-cases encountered by an artificial intelligence system can be difficult to resolve with confidence, potentially compromising the ability of the artificial intelligence system to complete a task successfully, safely, and in a timely manner.

SUMMARY

Devices, systems, and methods are directed to efficient and robust resolution of edge-cases encountered by artificial intelligence systems in real-world environments.

According to one aspect, a method may include receiving event data from a client application programming interface (API) associated with an intelligent software agent at least partially controlling an endpoint in an environment, the event data representing an edge-case encountered by the endpoint, identifying one or more tasks based on the event data, providing each task to a respective user interface of at least one user client, receiving, from a respective user interface of each user client, user input associated with each task provided to the at least one user client, based on the user input, determining a remedial action, and sending the remedial action to the client API to initiate resolution of the edge-case by the intelligent software agent at least partially controlling the endpoint in the environment.

In certain implementations, the event data may be received at an API gateway in communication between the client API and at least one user interface gateway. For example, the event data received by the API gateway from the client API may be selectively compressed according to connectivity between the API gateway and the client API. Further or instead, the event data received at the API gateway from the client API may be encrypted at a protocol level. Additionally, or alternatively, the event data received at the API gateway from the client API includes unstructured metadata. In some implementations, the event data may include information about the environment around the endpoint. For example, the information about the environment may correspond to a predetermined temporal window prior to the edge-case encountered by the endpoint. Further, or instead, the information about the endpoint may include an image, a video, an audio clip, text, or a combination thereof.

In some implementations, providing each task to the at least one user client may include opportunistically compressing the event data.

In certain implementations, the at least one user client may include a plurality of user clients, and identifying the one or more tasks based on the event data includes dividing the one or more tasks into a plurality of subtasks executable in parallel to one another across the plurality of user clients. For example, dividing the one or more tasks into the plurality of subtasks may include applying a grid to an image, and each one of the plurality of subtasks is associated with a section of the grid. Additionally, or alternatively, dividing the one or more tasks into the plurality of subtasks may include algorithmic matching of each one of the plurality of subtasks to the plurality of user clients. Further, or instead, dividing the one or more tasks into the plurality of subtasks may be based on extracting one or both of color or depth information from an image. Still further, or in the alternative, dividing the one or more tasks into the plurality of subtasks may be based on historical information.

In some implementations, providing each task to the at least one user client may include directing a given one of the one or more tasks to a plurality of user clients, and receiving the user input includes receiving a respective user input, based on the given task, from each respective user interface of the plurality of user clients. In some cases, the respective user input from each one of the plurality of user interfaces may include a respective vote, and determining the remedial action is based on the votes from the plurality of user interfaces.

In certain implementations, providing each task to the at least one user client may be based on availability of the at least one user client.

In some implementations, each user interface is associated with a respective profile of a respective specialist user logged in to the given user client, and providing each task to the at least one user client is based on the respective profile associated with each user client. As an example, each profile may include availability the respective specialist user, speed of response of the respective specialist user, accuracy of the respective specialist user, training completed by the respective specialist user, expertise of the respective specialist user, or a combination thereof. Further, or instead, providing each task to the at least one user interface may include requesting assistance from offline resources.

In certain implementations, determining the remedial action based on the user input may include translating the user input into one or more instructions executable by one or more processors on the endpoint in the environment.

In some implementations, determining the remedial action based on the user input may include introducing a predictive bias according to a historical record of successful resolutions of the edge-case.

In certain implementations, identifying the one or more tasks based on the event data may include identifying a plurality of tasks based on the event data, and determining the remedial action based on the user input includes combining the respective user input associated with each task of the plurality of tasks.

In some implementations, providing each task to at least one user interface may include providing a voting task to a plurality of user interfaces, receiving the respective user input includes receiving a respective vote from each one of the plurality of user interfaces associated with the voting task, and determining the remedial action based on the user input includes comparing the respective vote from each one of the plurality of user interfaces to the respective vote from one or more other user interfaces of the plurality of user interfaces.

In certain implementations, receiving event data from the client API associated with the intelligent software agent may include sending, to the intelligent software agent, a token associated with the resolution of the edge-case, receiving one or more requests from the intelligent software agent having the token, and responding to the one or more requests from the intelligent software agent having the token. For example, the one or more requests from the endpoint with the token may include a request for a state of the resolution of the edge-case. Further, or instead, the one or more requests from the endpoint having the token may include a request to push the resolution of the edge-case from a first server to a second server, with the first server and the second server each in communication with the at least one user interface.

According to another aspect, a computer program product encoded on one or more non-transitory computer storage media, the computer program product may have stored thereon instructions that, when executed by one or more computing devices, cause the one or more computing devices to perform operations comprising: receiving event data from a client application programming interface (API) associated with an intelligent software agent at least partially controlling an endpoint in an environment, the event data representing an edge-case encountered by the endpoint, identifying one or more tasks based on the event data, providing each task to at least one user client, receiving, from a respective user interface of each user client, respective user input associated with each task provided to the at least one user client, based on the user input, determining a remedial action, and sending the remedial action to the client API to initiate resolution of the edge-case by the intelligent software agent at least partially controlling the endpoint in the environment.

According to another aspect, a system may include an endpoint including an intelligent software agent associated with a client application programming interface (API), the intelligent software agent configured to at least partially control the endpoint in an environment, at least one user client, each user client including a respective user interface, and a server including one or more application programming interface (API) gateways and one or more user interface gateways, each one of the one or more API gateways in communication with the client API associated with the endpoint, each of the one or more user interface gateways in communication with the at least one user client, and the server including one or more processors and one or more non-transitory computer-readable media, the one or more processors in communication with the one or more API gateways and the one or more user interface gateways, and the one or more non-transitory computer-readable media having stored thereon computer executable code executable by the one or more processors to perform operations including at the one or more API gateways, receiving event data from the client API, the event data representing an edge-case encountered by the endpoint, identifying one or more tasks based on the event data, from the one or more user interface gateways, providing each task to the at least one user client, at the one or more user interface gateways, receiving from the respective user interface of the at least one user client, respective user input associated with each task provided to the at least one user client, based on the user input received at the one or more user interface gateways, determining a remedial action, and sending the remedial action from the one or more API gateways to the client API to initiate resolution of the edge-case by the intelligent software agent at least partially controlling the endpoint in the environment.

In certain implementations, the client API may be configured to retry sending the event data if the remedial action is not received at the client API within a predetermined period of time.

In some implementations, the one or more API gateways may include a plurality of API gateways. As an example, the plurality of API gateways may be in communication with one another according to a fail-operational arrangement. Additionally, or alternatively, the client API may be configured to send the event data to more than one of the plurality of API gateways. Further, or instead, the client API may be configured to send the event data to one of the API gateways nearest to the client API.

In certain implementations, each user interface of the one or more user clients may be associated with a respective profile of a respective specialist user logged in to the given user client, and the computer executable code stored on the one or more non-transitory computer readable media for causing the one or more processors of the server to perform the step of providing each task to the at least one user client includes dispatching each task the at least one user client based on the respective profile associated with the respective user interface of the user client.

BRIEF DESCRIPTION OF THE FIGURES

Like reference symbols in the various drawings indicate like elements.

DETAILED DESCRIPTION

The embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

In general, unless otherwise specified or a contrary intention is explicitly indicated, the term "edge-case," or variants thereof, shall be understood herein to include any combination of conditions that has not yet been encountered by artificial intelligence (AI) of an intelligent software agent. Thus, in instances in which AI of the intelligent software agent has been trained on a robust data for operation of the endpoint in the environment, an edge-case may include a combination of conditions that are rare, evanescent, or usual in relation to the physical environment in which the intelligent software agent at least partially controls the endpoint. Such conditions may include one or more aspects of a physical environment in which the intelligent software agent is operational to control a corresponding endpoint. By way of example, and not limitation, such aspects of the physical environment may include available light, terrain conditions, and/or objects that are anomalously present in a particular physical environment (e.g., a horse and buggy riding on a highway). Additionally, or alternatively, conditions associated with an edge-case may include one or more aspects of the endpoint operating in a physical environment. As a further non-limiting example, conditions associated with an edge-case may include one or more failure modes of sensors and/or actuators of the endpoint operating in the physical environment.

As used herein, the term "physical environment," and variations thereof, shall be understood to include any one or more of various, different physical environments in which an endpoint may move or otherwise interact with. Thus, for example, a physical environment may include roads in instances in which the endpoint is associated with at least partially automating controlled movement of a passenger vehicle. Further, or instead, a physical environment may include a surgical theater in instances in which the endpoint is associated with at least partially automating controlled movement of a surgical instrument as part of a medical procedure. As may be appreciated from these examples, the physical environment may include any one or more of various, different types of environments associated with the endpoint in a given setting, unless otherwise specified or made clear from the context.

Further, as used herein, the term "endpoint," and variations thereof, shall be understood to include any one or more of various different types of physical devices that connect to and exchange information with any one or more of the various different networks described herein to carry out any one or more of the various different techniques described herein. Thus, unless otherwise specified or made clear from the context, an endpoint may be present in the physical environment and operable to move one or more physical elements of the assembly in the physical environment and/or otherwise control interaction between the one or more physical elements and the physical environment. Further, for the sake of clear and efficient description in the disclosure that follows, the term "endpoint" shall be understood to be synonymous with the assembly of which the endpoint may be a part and, therefore, the endpoint is generally not distinguished from the assembly that is at least partially controlled by the endpoint in the physical environment. That is, the devices, systems, and methods of the present disclosure shall be understood to be generally applicable to at least partially controlling movement of an assembly through and/or interaction of an assembly with one or more aspects of a physical environment, and the type of assembly that is being at least partially controlled shall not be considered limiting. Thus, by way of example and not limitation, the devices, systems, and methods shall be understood to be implementable to control movement and/or other aspects of operation of passenger vehicles, off-road vehicles (e.g., farming vehicles, mining vehicles, etc.), watercraft (e.g., surface craft, submersible craft, etc.), aerial craft, specialized robots (e.g., robots for surgery, repetitive tasks, exploration, cleaning, etc.), to name only a few.

As used herein, the term "latency," and variations thereof, shall be understood to refer to an overall delay associated with processing and/or the flow of information (including presentation of information to a human operator and receiving input from the human operator) through systems described herein and/or through a particular portion of the systems described herein, with context of the use of the term providing guidance. Additionally, or alternatively, low latency shall be understood to refer to delays that are shorter than corresponding latency of a system that does not include the feature or features being described. Further, or instead, low latency of the overall systems described herein may be less than, for example, a typical rate of change of conditions in the physical environment of the endpoint that encountered the edge-case such that a human operator may typically have enough time to assess the edge-case and provide a resolution of a task in time to provide the endpoint with a meaningful resolution of the edge-case. Such a meaningful resolution of an edge-case may include, for example, a resolution that allows the endpoint to overcome the edge-case condition or conditions successfully (e.g., with little or no damage to people and/or property in the physical environment of the endpoint). In the context of the overall systems described herein, low latency of overall systems described herein may be less than about 2 minutes (e.g., less than about a minute, less than about 30 seconds, less than about ten seconds, or less than about 5 seconds) with the delay associated with the low latency depending on, among other things, the use case (e.g., road vehicle as compared to a farm vehicle as compared to a warehouse robot, etc.). In the context of low latency of overall systems shall be understood delays associated with assessment and response from one or more human operators and, thus, Referring now to FIGS. 1A-1D, a system 100 for edge-case resolution in artificial intelligence systems may include one or more instances of an endpoint 102, with each instance of the endpoint 102 including an intelligent software agent 103. The intelligent software agent 103 may at least partially control movement or other activity/interaction of the respective instance of the endpoint 102 in a physical environment (e.g., in one or more of environment A or environment B). Under operating conditions that are regularly encountered and for which the intelligent software agent 103 has been previously trained (using artificial intelligence techniques), the intelligent software agent 103 may provide at least partially automated control of the endpoint 102 in the physical environment. However, such training—and, thus, the capability of the intelligent software agent 103 to provide automated control over the respective instance of the endpoint 102 in the physical environment—has its limits. Specifically, training the intelligent software agent 103 to deal with every edge-case that can possibly occur in a particular physical environment can be prohibitive in terms of time, cost, and/or a priori knowledge of edge-cases. This limitation on training is important, for example, in implementations in which edge-cases have the potential for significant consequences to safety and/or efficient operation of each instance of the endpoint 102 in the physical environment. Thus, as may be appreciated from the foregoing, certain edge-cases represent a chicken-and-egg problem in commercial deployment of the intelligent software agent 103 for automating control of the respective instance of the endpoint 102—namely, training the intelligent software agent 103 to deal with an edge-case requires operation of the respective endpoint 102 to identify the edge-case but, before the intelligent software agent 103 is trained to deal with the edge-case, the intelligent software agent 103 may be unable to resolve the edge-case successfully, with the result being inefficient operation of the endpoint 102, damage to the endpoint 102, damage to one or more elements of the physical environment, or a combination thereof. In many physical environments, the prospect of significant safety and/or cost implications resulting from improper resolution of edge-cases can present a barrier to implementing automated control of the one or more instances of the endpoint 102 in a physical environment.

Figure 1A:
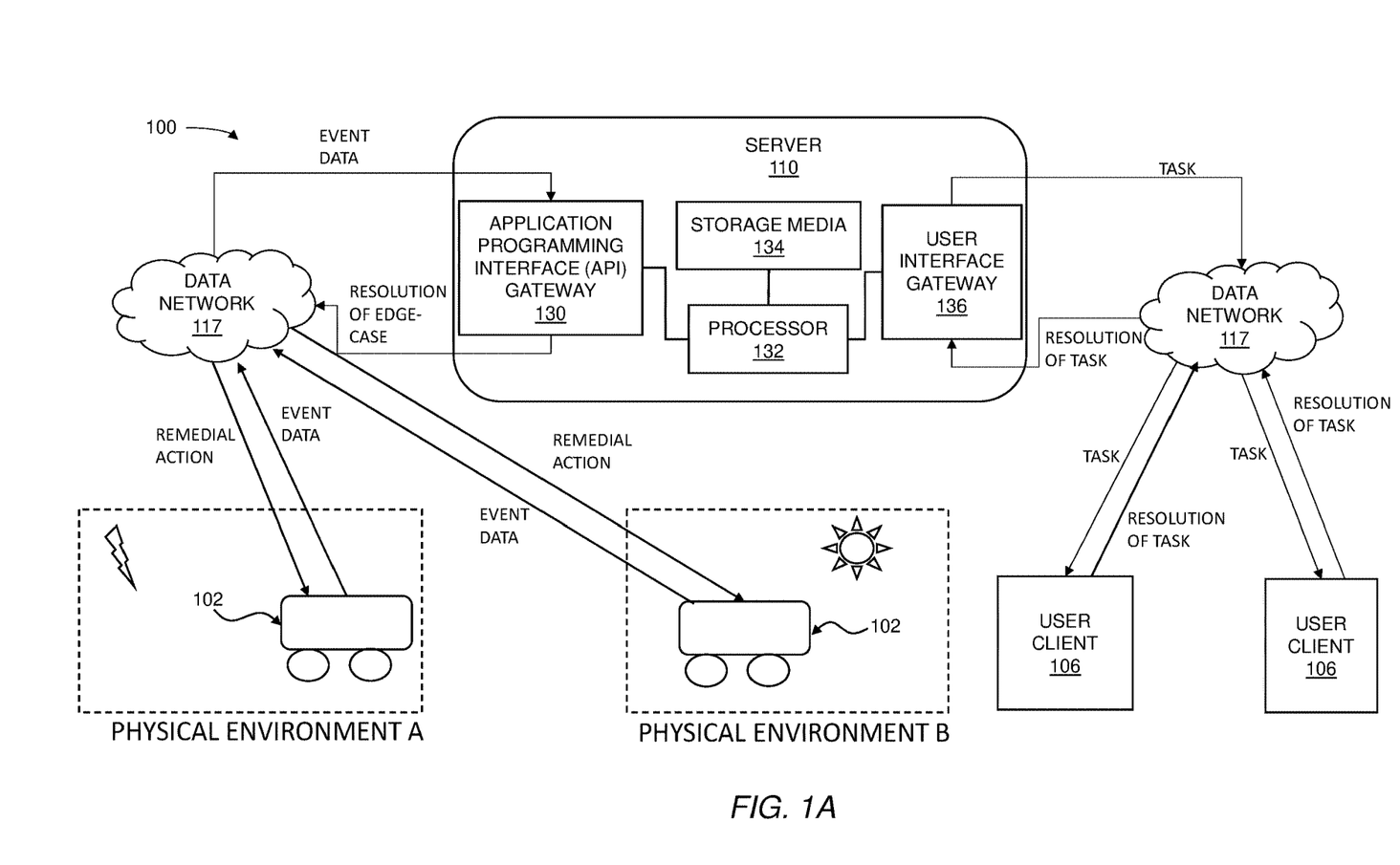
FIG. 1A is a block diagram of a system for edge-case resolution in artificial intelligence systems.

To address the foregoing barriers to implementing automated control in physical environments, the system 100 may use selective intervention by one or more human operators to facilitate efficient, robust, and safe remedial action to resolve edge-cases encountered by the one or more instances of the endpoint 102. That is, the system may include a server 110 in communication with each instance of the endpoint 102 and with each instance of a user client 106. As described in greater detail below, the server 110 may receive an edge-case identified by the respective instance of the intelligent software agent 103 of a given instance of the endpoint 102 and manage communication with the at least one instance of the user client 106 to incorporate human input into a resolution of the edge-case. The human input can increase the likelihood that the corresponding instance of the endpoint 102 may successfully deal with the edge-case while additionally, or alternatively, providing training data at least for the respective instance of the intelligent software agent 103 of the given endpoint 102 (e.g., for the respective instance of the intelligent software agent 103 of each instance of the endpoint 102 in some cases). Significantly, as also described in greater detail below, the system 100 may include various features that facilitate low latency communication such that, once an edge case is encountered, human input may be used to generate remedial action to resolve the edge-case quickly. This may, for example, facilitate providing near real-time quality assurance with respect to operation of each instance of the endpoint 102. By way of example, as compared to slower systems, the low latency features of the system 100 may facilitate resolution of the edge-case before conditions in the physical environment can change significantly. This, in turn, may improve safety and/or efficiency of operation of the given endpoint 102 in the physical environment. Further, or instead, as compared to a fully autonomous system that operates without any human input, the selective introduction of human input using the system 100 may advantageously increase robustness of performance of each instance of the endpoint 102 in a corresponding physical environment. Additionally, or alternatively, as compared to systems that are manually controlled by remote human operators, the selective use of human input to generate remedial action to resolve edge-cases using the system 100 may make more efficient use of personnel resources, given that a single human operator may provide selective input to multiple instances of the endpoint 102 operating simultaneously.

Having described certain aspects of overall operation of the system 100 for edge-case resolution in artificial intelligence systems, attention is directed now to description of certain aspects the one or more instances of the endpoint 102 (hereafter, the endpoint 102), the one or more instances of the user client 106 (hereafter, the user client 106), and the server 110 useful for carrying out any one or more of the various different edge-case resolution techniques described herein. Unless otherwise specified or made clear from the context, it shall be appreciated that the system 100 may include the endpoint 102, the user client 106, and the server 110, each with any combination of the various different features described herein, without departing from the scope of the present disclosure.

Endpoint

Figure 1B:
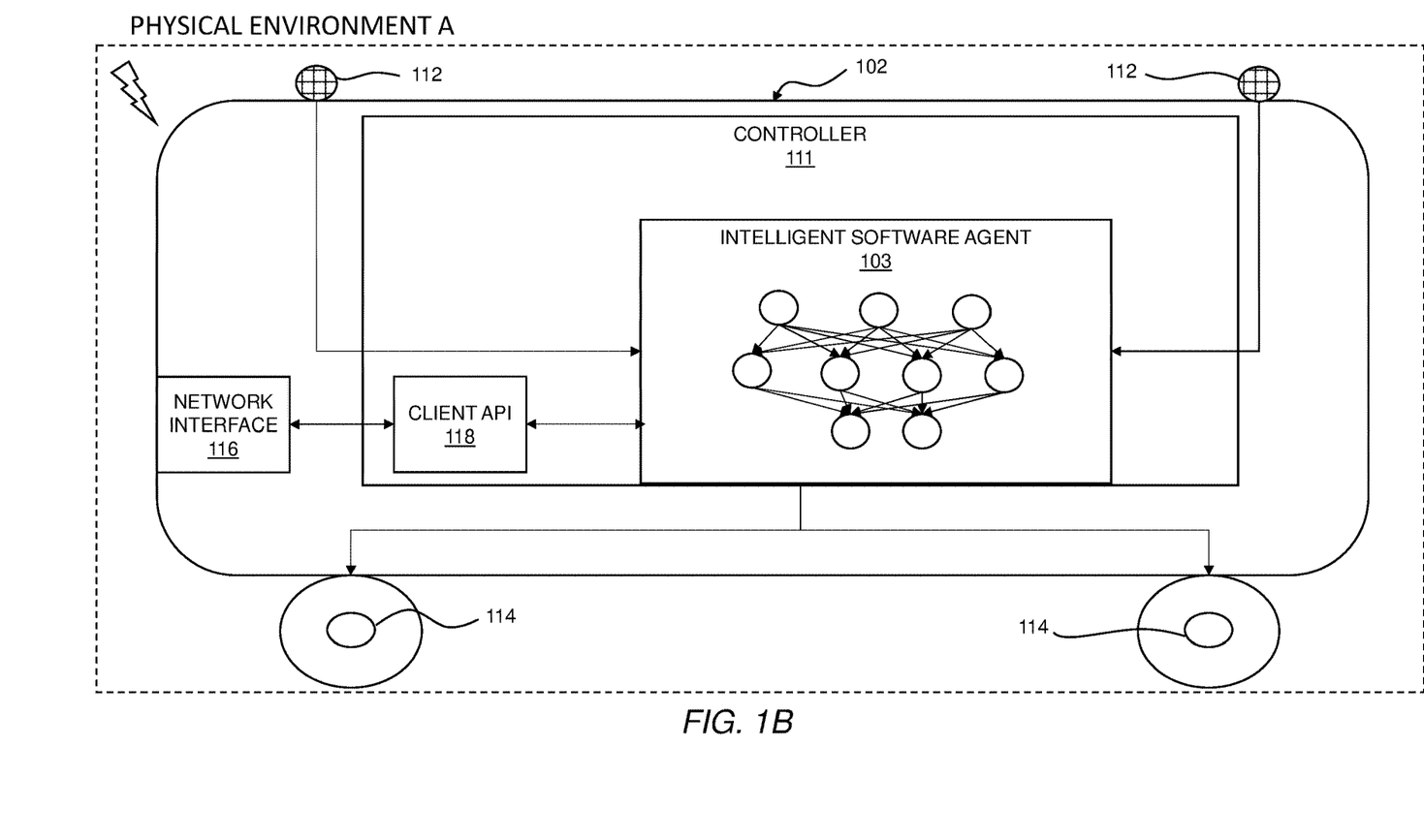
FIG. 1B is a block diagram of an endpoint of the system of FIG. 1A.

The endpoint 102 may include a controller 111, one or more instances of a sensor 112 (hereinafter, the sensor 112), one or more instances of an actuator 114 (hereinafter, the actuator 114), and a network interface 116. The controller 111 may be coupled in communicating relationship (e.g., wired and/or wireless communication) with the sensor 112, the actuator 114, and the network interface 116. The controller 111 may generally receive a feedback signal from the sensor 112 regarding aspects of a physical environment (e.g., physical environment A) of the endpoint 102. Based on the feedback signal, the controller 111 may send an actuation signal to the actuator 114 to control interaction of the endpoint 102 with the physical environment. For example, as described in greater detail below, the controller 111 may have stored thereon the intelligent software agent 103 such that the feedback signal from the sensor 112 may be input to the intelligent software agent 103, and the actuation signal to the actuator 114 may be output from the intelligent software agent 103. In instances in which the intelligent software agent 103 encounters an edge-case, the controller 111 may send event data to the server 110 via the network interface 116. In response to the event data associated with the edge-case, the controller 111 may receive a remedial action signal from the server 110 via the network interface 116, and the controller 111 may resolve the edge-case by generating the actuation signal to the actuator 114 based on the remedial action signal. As described in greater detail below, the remedial action signal received by the controller 111, via the network interface 116, may be based on user input from a human associated with the one or more user clients 106 such that the edge-case may be resolved with increased confidence (e.g., likelihood of damage or other unintended interaction between the endpoint) as compared to resolution of the edge-case based on knowledge of the intelligent software agent 103 alone. Additionally, or alternatively, the remedial action signal received by the controller 111, via the network interface 116, may be incorporated into updating training of the intelligent software agent 103, such as may be useful for decreasing the need for human intervention in future encounters with conditions similar to those of the edge-case.

The controller 111 may include any combination of software and/or processing circuitry for controlling the endpoint 102 according to any one or more of the various different techniques described herein, including without limitation application-specific integrated circuits, microprocessors, microcontrollers, programmable gate arrays, and any other digital and/or analog components, or any combination of the foregoing, along with inputs and outputs for transceiving control signals, power signals, sensor signals, communication signals, and the like. This may include, for example, circuitry included in any one or more components of the endpoint 102 and additionally, or alternatively, may include a processor coupled to components of the endpoint 102. Various functions described herein may be allocated between any one or more of the foregoing components, and the controller 111 shall be understood to include any such allocation of functionality unless otherwise specified or made clear from the context.

The intelligent software agent 103 stored on the controller 111 may perceive a physical environment (e.g., the physical environment A) of the endpoint 102 based on the feedback signal from the sensor 112 and may act autonomously to actuate the actuator 114 achieve one or more goals associated with operation of the endpoint 102 in the physical environment. Additionally, or alternatively, the intelligent software agent 103 may improve performance with learning or knowledge based, for example, on a remedial action signal received by the controller 111 in response to an edge-case encountered by the endpoint 102 in the physical environment. Unless otherwise specified, or made clear from the context, the intelligent software agent 103 may be any one or more of various, different types of artificial intelligence (AI), machine learning, and/or deep learning directed toward achieving goal-directed behavior. Thus, for example, the intelligent software agent 103 may include simple reflex agents, model-based reflex agents, goal-based agents, utility-based agents, learning agents, logic-based agents, reactive agents, belief-desire-intention agents, or any combination thereof. Additionally, or alternatively, the intelligent software agent 103 may include any one or more of various, different artificial neural network architectures and/or evolutionary computing architectures.

In certain implementations, the intelligent software agent 103 may be programmed to optimize at least one goal function (also known as an objective function, a utility function, or a loss function) of the endpoint 102 operating in a physical environment (e.g., the physical environment A). For example, in instances in which the endpoint 102 is a vehicle, one goal function may be to avoid collisions between the endpoint 102 and elements in the physical environment. Continuing with this example, another goal function of the endpoint 102 may be to avoid sudden braking. As may be appreciated from the foregoing example, as the intelligent software agent 103 encounters unusual conditions in the physical environment, the intelligent software agent 103 may be unable to optimize one or more goal functions to within an acceptable range, and such unusual conditions may be deemed an edge-case.

In certain implementations, the controller 111 of the endpoint 102 may additionally, or alternatively, include a client application programming interface (API) 118 associated with the intelligent software agent 103.

As an example, the client API 118 may receive event data from the intelligent software agent 103 and, more specifically, may receive event data representing an edge-case encountered by the endpoint 102. The client API 118 may process the event data associated with the edge-case into a client-side request for resolution of the edge-case that may include, among other things, the type and format of information required by the server 110 to respond to this client-side request originating from the endpoint 102. The client-side request for resolution processed by the client API 118 may be sent to the network interface 116 and transmitted from the endpoint 102 to the server 110 via the data network 117.

Further, or instead, the client API 118 may receive a remedial action signal from the server 110 via the communication between the server 110 and the network interface 116 over the data network. Continuing with this example, the client API 118 may process the remedial action signal to initiate resolution of the edge-case by the intelligent software agent 103. In certain implementations, the client API 118 may process the remedial action signal into one or more direct actuation commands for the actuator 114. Additionally, or alternatively, the client API 118 may process the remedial action signal into training data that may be used by the intelligent software agent 103 in furtherance of the goal-oriented behavior sought by the intelligent software agent 103.

In certain implementations, the client API 118 may facilitate reducing latency in resolving the edge-case of the endpoint 102. For example, the client API 118 may be configured to retry sending the event data if a remedial action is not received at the client API 118 within a predetermined period of time. This may reduce the likelihood of long delays resulting from slow and/or inconsistent communication over the data network 117. Further, or instead, the client API may be configured to send the event data to more than one API gateway associated with the server 110. Further, or instead, the client API 118 may be configured to send the event data to an API gateway that is associated with the server 110 and nearest to the client API 118.

In general, the sensor 112 may include any one or more of various, different types of sensors useful for providing input to the intelligent software agent 103 of the controller 111 for perceiving the physical environment (e.g., the physical environment A) of the endpoint 102. Thus, for example, the sensor 112 may include any one or more of a camera, a light detection and ranging (lidar) sensor, a microphone, a tactile sensor, an optical sensor, a global positioning system (GPS), a force sensor, a temperature sensor, and the like. While the feedback signal from the sensor 112 to the intelligent software agent 103 of the controller 111 may include raw data, it shall be appreciated that the feedback signal from the sensor 112 to the intelligent software agent 103 may be processed according to any one or more of various known signal processing techniques, such as may be useful for achieving high-speed response from the intelligent software agent 103 and/or for managing local data storage requirements of the controller 111.

The actuator 114 may generally include any one or more of various, different types of actuators controllable by the controller 111 based on output from the intelligent software agent 103 to carry out goal-directed behavior of the endpoint 102 in the physical environment (e.g., the physical environment A). Thus, for example, the actuator 114 may include any one or more of an electric linear actuator, an electric rotary actuator, an electric motor, an internal combustion engine, a hydraulic actuator, a pneumatic actuator, a solenoid, a piezoelectric actuator, and the like. While the output from the intelligent software agent 103 to each instance of the actuator 114 may be the same in some implementations, it shall be appreciated that this is not necessarily required or even desirable in some instances. That is, in certain implementations, the output from the intelligent software agent 103 to each instance of the actuator 114 may be different such that the combined result of the outputs achieves the goal-oriented behavior directed by the intelligent software agent 103 and/or by human intervention according to any one or more of the various different techniques described herein.

In general, the network interface 116 may include hardware and/or software for connecting the endpoint 102 in communicating relationship with the server 110, via a data network 117, to send event data to and receive a remedial action signal from the server 110 to carry out any one or more of the various different edge-case resolution techniques described herein. In certain implementations, the server 110 may be a remote resource and the data network 117 may include the internet. Additionally, or alternatively, the server 110 may be a local resource accessible using short range wireless communication protocols (e.g., radio frequency communication such as WiFi) and/or physical connection (e.g., ethernet). Unless otherwise specified or made clear from the context, the network interface 116 may include, for example, a router, a modem, network card, or other similar reading or writing resources.

User Client

Figure 1C:
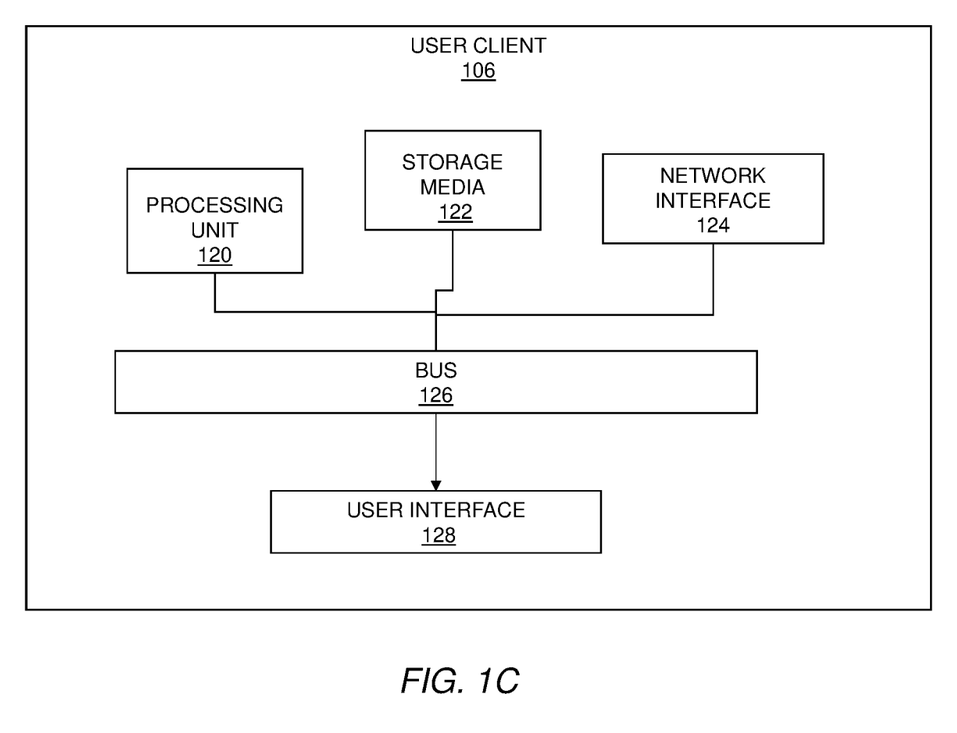
FIG. 1C is a block diagram of a user client of the system of FIG. 1A.

The user client 106 may include a processing unit 120, non-transitory, computer-readable storage media 122, a network interface 124, a bus 126, and a user interface 128. The processing unit 120, the non-transitory, computer-readable storage media 122, and the network interface may each be electromechanically connected to one another via the bus 126 which, in some instances, may include a plurality of busses interconnected to one another. In general, the processing unit 120 may be operable to carry out any one or more processing instructions stored on the non-transitory, computer-readable storage media 122. For example, the non-transitory, computer-readable storage media 122 may have stored thereon instructions for causing the processing unit 120 to carry out steps including receiving a task from the server 110 via communication between the network interface 124 and the server 110 over the data network 117, presenting the task to the user interface 128, based on the task presented to the user interface 128, receiving an input from a user via the user interface 128, and sending resolution of the task to the server 110 via the communication between the network interface 124 and the server 110 over the data network 117. Unless otherwise specified or made clear from the context, the network interface 124 may be any one or more of the various, different network interfaces described herein. Thus, in certain implementations, the network interface 124 may be the same type of network interface as the network interface 116 of the endpoint 102. Alternatively, the network interface 124 of the user client 106 may be a different type of network interface as the network interface 116 of the endpoint 102, such as may be useful for accommodating disparate operating environments of the endpoint 102 in an uncontrolled physical environment (e.g., outdoors) as compared to the user client 106 in a controlled environment (e.g., an office setting).

In general, the user interface 128 may support providing output to a user associated with the user client 106 (e.g., a user logged into the user client 106) and receiving input from the user based on the information presented to the user via the user interface 128. Thus, for example, the user interface 128 may include a computer monitor, virtual reality glasses, an augmented reality display, a speaker, a camera, a keyboard, a mouse, a joystick, a microphone, a foot pedal, a haptic device, or any combination thereof. As an example, a graphical user interface (GUI) may be used to present one or more tasks to the user associated with the user client 106. In response to information presented to the user through the GUI, the user may use any one or more of various, different peripheral devices (e.g., a combination of a keyboard and mouse) in communication with the user interface 128 to provide a resolution to the one or more tasks. It shall be appreciated that the response from the user through the user interface 128 may be task-specific and, thus, may take on any one or more of various, different forms. By way of example and not limitation, such input from the user through the user interface 128 may include text, image marking and/or tagging, menu selection, etc. Additionally, or alternatively, the GUI may present the user with decision tooling (e.g., icons, windows, images, etc.) that may change depending on the task being presented to the user. In implementations in which resolution of the edge-case encountered by the endpoint 102 may be time-sensitive, the GUI may include a timer presented to the user. Further, or instead, the user client 106 may time-out the task if the user has not provided an input to the user interface 128 within a predetermined threshold period.

Server

Figure 1D:
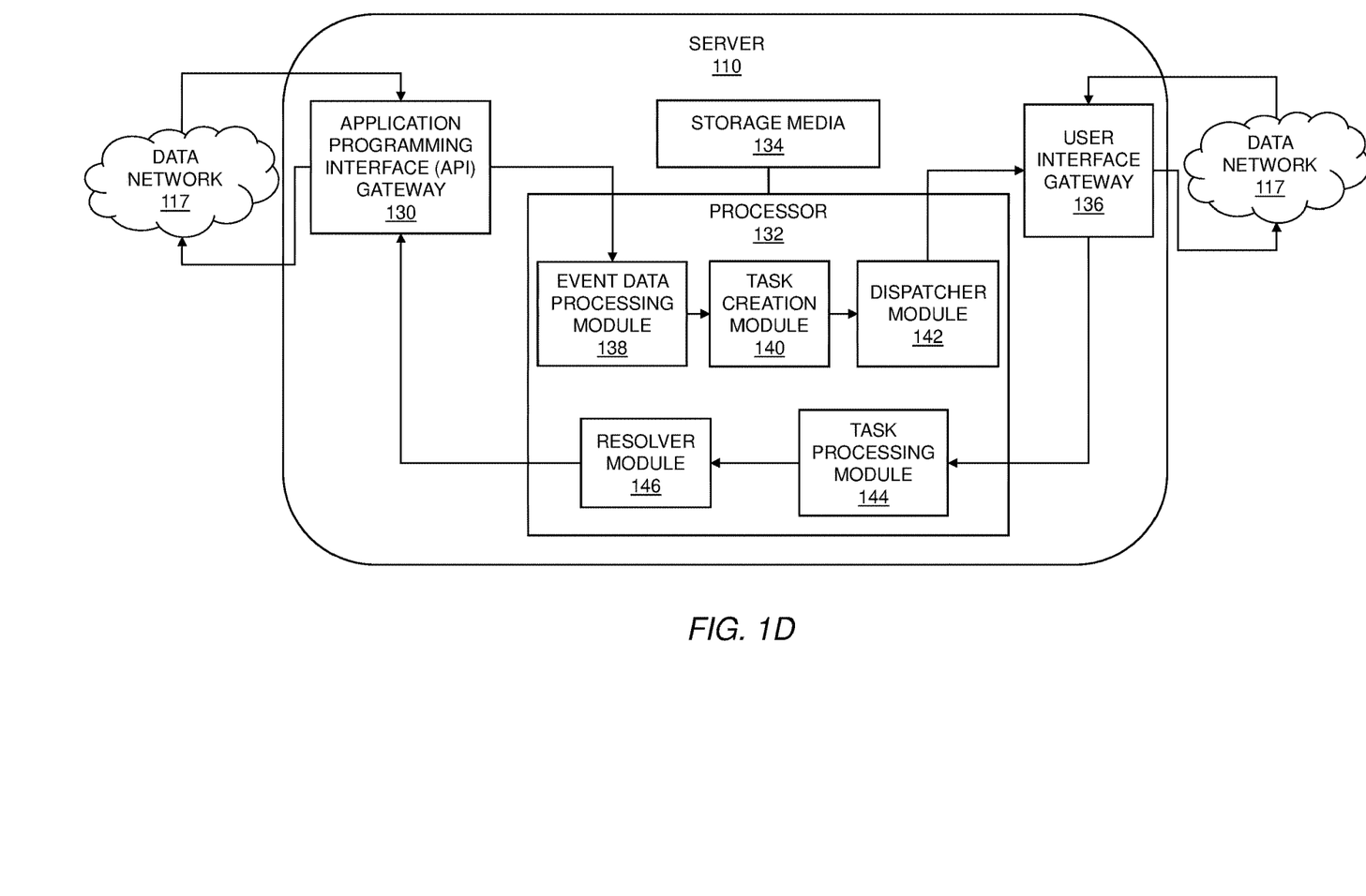
FIG. 1D is a block diagram of a server of the system of FIG. 1A.

In general, the server 110 may include any combination of hardware or software provided as a resource (e.g., a remote resource) to the endpoint 102 and to the user client 106 to resolve edge-cases according to the various different techniques described herein. As an example, the server 110 may include an application programming interface (API) gateway 130, one or more processors 132, non-transitory, computer-readable storage media 134, and a user interface gateway 136 in a communicating relationship with one another. In certain implementations, the server 110 may be part of a virtual private network (VPN) and, in certain instances, the VPN including the server 110 may include the endpoint 102, the user client 106, or a combination thereof, such as may be useful to facilitate sending and receiving securely over a public network.

In general, the API gateway 130 may be in communication with the client API 118 over the data network 117. For example, the API gateway 130 may receive any one or more of various, different client-side requests generated by the client API 118 and including, among other things, event data associated with an edge-case encountered by the endpoint 102. Further, or instead, the API gateway 130 may process a remedial action determined by the server 110 based on one or more inputs received from the user client 106, as described in greater detail below. The API gateway 130 may process the remedial action into a type and format useful for the controller 111 (e.g., the intelligent software agent 103 of the controller 111) to initiate the remedial action at the endpoint to resolve the edge-case. While a single instance of the API gateway 130 may be used in some instances, it shall be appreciated that a plurality of instances of the API gateway 130 may additionally or alternatively used. In such instances, the plurality of instances of the API gateway may be in communication with one another according to a fail-operation arrangement.

The user interface gateway 136 may be a network node logically or physically between the server 110 and the user client 106 in communication with the server 110 over the data network 117. The user interface gateway 136 may, for example, send tasks (generated by the server 110, as described in greater detail below) from the server to the user client 106 over the data network 117 (e.g., the internet). As another example, the user interface gateway 136 may receive resolution of tasks from the user client 106 and send the received resolution of tasks to the server 110 for generation of a remedial action, as described in greater detail below.

In general, the one or more processors 132 may be operable to carry out any one or more processing instructions stored on the non-transitory, computer-readable storage media 122. For example, the non-transitory, computer-readable storage media 122 may have stored thereon instructions for causing the one or more processors 132 carry out an event data processing module 138, a task creation module 140, a dispatcher module 142, a task processing module 144, and a resolver module 146.

The event data processing module 138 may remove information from the event data received from the endpoint 102 to facilitate lower latency response by the server 110 in generating the remedial action to be initiated by the endpoint 102 edge-case encountered by the endpoint. For example, the event data processing module 138 may capture one or more images from a video clip and/or remove color from an image to reduce the size of files of information to be processed by the server 110 and eventually sent to the user client 106 for human intervention. Additionally, or alternatively, the event data processing module 138 may reduce resolution of certain types of event data based on the content of event data. Further, or instead, the event data processing module 138 may remove a portion of the event data that is unrelated to the edge-case encountered by the endpoint 102. Further, or instead, the event data processing module 138 may coordinate a number of requests received within a particular window. Such coordination of requests may include prioritizing requests relative to one another and/or bundling similar requests together for subsequent processing by the server 110.

The task creation module 140 may generally parse the processed event data (received from the event data processing module 138) into one or more discrete tasks that may be resolved (e.g., definitively resolved) through user input received by a user associated with the user client 106. In certain implementations, the task creation module 140 may decompose a cognition request into smaller tasks if the task creation module 140 deems that the cognition request would likely take too long for the user associated with the user client 106. Such decomposition of tasks may be based, for example, on an average processing speed of users resolving similar tasks in the past. Further, or instead, decomposition of tasks may be based on knowledge of past performance of a specific user associated with the user client 106. More generally, it shall be appreciated that decomposing a cognition request into smaller tasks may facilitate distributing the smaller tasks to a larger number of users associated with respective instances of the user client 106. To the extent the larger number of users may work on the tasks in parallel with one another, the overall result may be faster processing of the cognition request and, thus, lower latency in initiating remedial action to resolve the edge-case encountered by the endpoint 102.

The dispatcher module 142 may generally distribute the tasks (determined by the task creation module 140) across the one or more instances of the user client 106. Such distribution of tasks by the dispatcher module 142 may depend, for example, on how many of the one or more user clients 106 are online and available for receiving tasks from the server 110. Additionally, or alternatively, distribution of tasks by the dispatcher module 142 may depend on the skills and/or past history of the users associated with the one or more instances of the user client 106.

As an example, the dispatcher module 142 may distribute the tasks according to a function cost-optimized for one or more different parameters. For example, the function may be cost-optimized for pairing skills and/or history of effectiveness of available users with the tasks required to be resolved to facilitate achieving resolution of the tasks with high accuracy. As an example, an example tasks may be preferentially routed to individuals who have a history of higher accuracy than an individual who has a history of lower accuracy. Further, or instead, the function may be cost-optimized for the most efficient use of users associated with the one or more instances of the user client 106. Apart from facilitating the use of fewer users, such efficiency may facilitate achieving shorter latency by reducing or eliminating delays that may be caused by a workflow that requires a given user to continuously switch contexts. That is, the function for distributing tasks may attempt to route the same task or similar tasks to a given user, as this may facilitate faster response times by the user. For example, if numerous tasks need to be resolved and a first task requires 5 second and a second task requires 10 seconds, the dispatcher module 142 may feed the first task and the second task to a single user to increase the likelihood of returning resolution of both tasks within a threshold response time. Additionally, or alternatively, the function may be cost-optimized for responsiveness (e.g., to meet a predetermined threshold for initiating the remedial action to resolve the edge-case encountered by the endpoint). In instances in which the dispatcher module 142 distributes tasks according to more than one parameter, it shall be appreciated that the factors may be weighted the same or differently, depending on the application.

Following distribution of the tasks to the from the dispatcher module 142 of the server to the one or more instances of the user client 106, the task processing module 144 of the server 110 may generally receive one or more task resolutions from the corresponding one or more instances of the user client 106 that received the task. For example, to the extent the distributed tasks are related to each other, and the corresponding resolutions of the tasks are received by the server 110 at different times, the task processing module 144 may temporally synchronize the resolution of the tasks with one another. Further, or instead, the task processing module may remove task resolution responses that are corrupted and/or incomplete.

In general, the resolver module 146 may determine a remedial action (which may include one or more instructions to the endpoint 102) based on the task resolutions processed by the task processing module 144. For example, in instances in which the same task was sent to multiple users, the resolver module 146 may determine the remedial action based on a voting algorithm. In certain instances, the voting algorithm may weight each task resolution the same. In other instances, the voting algorithm may weight each task resolution based on the skills and/or accuracy of the user associated with a given task resolution. Further, or instead, the resolver module 146 may combine the respective resolutions of different tasks to determine an appropriate remedial action to be initiated to resolve the edge-case encountered by the endpoint 102.

Figure 2:
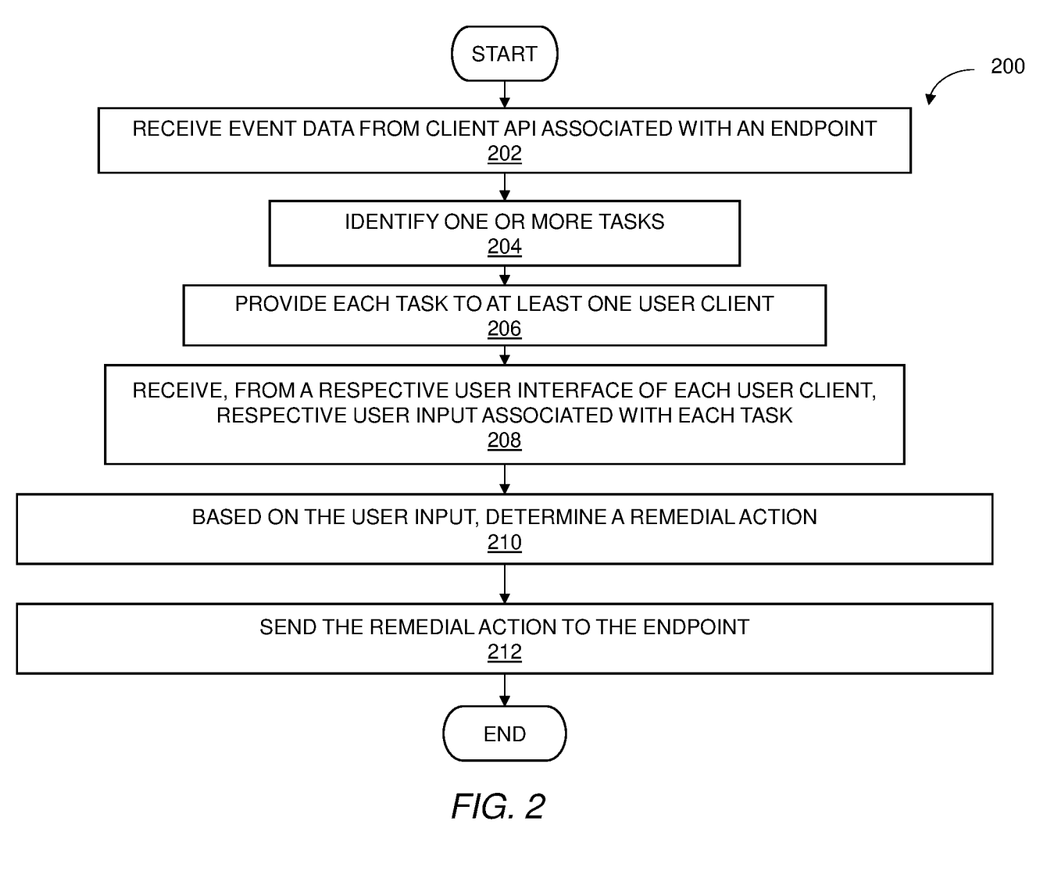
FIG. 2 is a flow chart of an exemplary method of edge-case resolution in artificial intelligence systems.

FIG. 2 is a flow chart of an exemplary method 200 of edge-case resolution in artificial intelligence systems. Unless otherwise specified or made clear from the context, it shall be appreciated that the non-transitory, computer-readable storage media 134 (FIG. 1A and FIG. 1D) may have stored thereon computer executable code executable by the one or more processors 132 (FIGS. 1A and 1D) to carry out any one or more of the various different methods described herein. By way of example, these methods may facilitate providing limited human intervention for selective and efficient resolution of edge-cases encountered by any one or more of the various different endpoints described herein. Such efficient human intervention may, among other things, promote rapid resolution of edge-cases (e.g., in real-time or near real-time) across a large number of deployed artificial intelligence systems using only a small number of trained personnel.

As shown in step 202, the exemplary method 200 may include receiving event data from a client application programming interface (API) associated with an intelligent software agent at least partially controlling an endpoint in an environment, the event data representing an edge-case encountered by the endpoint. For example, the event data may include information about the physical environment around the endpoint (e.g., an image, a video, an audio clip, text, or a combination thereof). Such information about the physical environment may, in some instances, correspond to a predetermined temporal window prior the edge-case encountered by the endpoint, as may be useful for determining causality of the edge-case.

In certain implementations, the event data may be received at an API gateway such as any one or more of the various different API gateways descried herein. The API gateway may, for example, be in communication between a client API associated with the endpoint. Continuing with this example, the event data received by the API gateway from the client API may be selectively compressed according to connectivity between the API gateway and the client API. In certain implementations, the event data received at the API gateway from the client API may be encrypted at a protocol level. In certain implementations, the event data received at the API gateway from the client API may include unstructured metadata. Additionally, or alternatively, the API gateway may be in communication with at least one user interface gateway, such as any one or more of the various, different user interface gateways described herein.

In some implementations, to facilitate low latency resolution of the edge-case, receiving event data from the client API associated with the intelligent software agent may include sending, to the intelligent software agent, a token associated with the resolution of the edge-case, and receiving one or more requests from the intelligent software agent having the token. For example, the one or more requests from the endpoint with the token include a request for a state of the resolution of the edge-case. Additionally, or alternatively, the one or more requests from the endpoint having the token may include a request to push the resolution of the edge-case from a first server to a second server, with the first server and the second server each in communication with the at least one user interface.

As shown in step 204, the exemplary method 200 may include identifying one or more tasks based on the event data. For example, identifying the one or more tasks based on the event data may include dividing the one or more tasks into a plurality of smaller tasks (hereinafter the plurality of subtasks) executable in parallel to one another across the plurality of user clients. In certain instances, dividing the one or more tasks into the plurality of subtasks may include applying a grid to an image. Each one of the plurality of subtasks may be associated with a section of the grid. Further, or instead, dividing the one or more tasks into the plurality of subtasks may include algorithmic matching of each one of the plurality of subtasks to the plurality of user clients. Still further, or instead, dividing the one or more tasks into the plurality of subtasks may be based on extracting one or both of color or depth information from an image. In addition, or in the alternative, dividing the one or more tasks into the plurality of subtasks may be based on historical information associated with the endpoint.

As shown in step 206, the exemplary method 200 may include providing each task to a respective user interface of at least one user client (e.g., a plurality of user clients). In certain implementations, providing each task to the respective user interface of the at least one user client may include opportunistically compressing the event data. Further, or instead, providing each task to the at least one user interface may be based on availability of the at least one user interface. Each user interface may be associated with a respective profile of a respective specialist user logged in to the given user client and, in such instances, providing each task to the at least one user client may be based on the respective profile associated with each user client. Each profile may include availability the respective specialist user, speed of response of the respective specialist user, accuracy of the respective specialist user, training completed by the respective specialist user, expertise of the respective specialist user, or a combination thereof. Further, or instead, providing each task to the at least one user interface may include requesting assistance from offline resources.

As shown in step 208, the exemplary method 200 may include receiving, from a respective user interface of each user client, respective user input associated with each task provided to the at least one user client. For example, the respective user input associated with each task may be received at a user interface gateway, such as any one or more of the user interface gateways described herein. In certain instances, one or more of the same task may be directed to a plurality of user clients and, in such instances, receiving respective user input associated with each task may include receiving a respective user input from each respective user interface of the plurality of user clients. As a specific example, a voting task may be directed to a plurality of user clients and, thus, receiving respective user input associated with each task may include receiving a respective vote from each one of the plurality of user clients that received the voting task.

As shown in step 210, the exemplary method 200 may include, based on the user input, determining a remedial action. For example, determining the remedial action based on the user input may include translating the user input into one or more instructions executable by one or more processors on the endpoint in the physical environment. Further, or instead, determining the remedial action based on the user input may include introducing predictive bias according to a historical record of successful resolutions of the edge-case. In instances in which the event data are parsed into a plurality of tasks based on the event data, determining the remedial action based on the user input may include combining the respective user input associated with each task of the plurality of tasks. For example, returning to the example of voting tasks, determining the remedial action may be based on the votes from the plurality of user interfaces (e.g., by a simple majority of votes and/or using voting weighted according to one or more aspects of a user profile).

As shown in step 212, the exemplary method 200 may include sending the remedial action to the client API to initiate resolution of the edge-case by the intelligent software agent at least partially controlling the endpoint in the environment. For example, the remedial action may be sent to the client API from an API gateway, via a data network.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A method comprising:
   receiving event data from a client application programming interface (API) associated with an intelligent software agent at least partially controlling an endpoint in an environment, the event data representing an edge-case encountered by the endpoint, wherein the event data is received at an API gateway in communication between the client API and at least one user interface gateway;
   identifying one or more tasks based on the event data;
   providing each task to a respective user interface of at least one user client;
   receiving, from a respective user interface of each user client, user input associated with each task provided to the at least one user client;
   based on the user input, determining a remedial action; and
   sending the remedial action to the client API to initiate resolution of the edge-case by the intelligent software agent at least partially controlling the endpoint in the environment.

2. The method of claim 1, wherein the event data received by the API gateway from the client API is selectively compressed according to connectivity between the API gateway and the client API.

3. The method of claim 1, wherein the event data includes information about the environment around the endpoint.

4. The method of claim 3, wherein the information about the environment corresponds to a predetermined temporal window prior to the edge-case encountered by the endpoint.

5. The method of claim 3, wherein the information about the endpoint includes an image, a video, an audio clip, text, or a combination thereof.

6. The method of claim 1, wherein the at least one user client includes a plurality of user clients, and identifying the one or more tasks based on the event data includes dividing the one or more tasks into a plurality of subtasks executable in parallel to one another across the plurality of user clients.

7. The method of claim 1, wherein providing each task to the at least one user client includes directing a given one of the one or more tasks to a plurality of user clients, and receiving the user input includes receiving a respective user input, based on the given one of the one or more tasks, from each respective user interface of the plurality of user clients.

8. The method of claim 1, wherein providing each task to the at least one user client is based on availability of the at least one user client.

9. The method of claim 1, wherein each user interface is associated with a respective profile of a respective specialist user logged in to a given user client, and providing each task to the at least one user client is based on the respective profile associated with each user client.

10. The method of claim 1, wherein determining the remedial action based on the user input includes translating the user input into one or more instructions executable by one or more processors on the endpoint in the environment.

11. The method of claim 1, wherein determining the remedial action based on the user input includes introducing a predictive bias according to a historical record of successful resolutions of the edge-case.

12. The method of claim 1, wherein identifying the one or more tasks based on the event data includes identifying a plurality of tasks based on the event data, and determining the remedial action based on the user input includes combining the respective user input associated with each task of the plurality of tasks.

13. The method of claim 1, wherein providing each task to at least one user interface includes providing a voting task to a plurality of user interfaces, receiving the respective user input includes receiving a respective vote from each one of the plurality of user interfaces associated with the voting task, and determining the remedial action based on the user input includes comparing the respective vote from each one of the plurality of user interfaces to the respective vote from one or more other user interfaces of the plurality of user interfaces.

14. A computer program product stored on one or more non-transitory computer storage media, the computer program product comprising instructions that, when executed by one or more computing devices, cause the one or more computing devices to perform operations comprising:

receiving event data from a client application programming interface (API) associated with an intelligent software agent at least partially controlling an endpoint in an environment, the event data representing an edge-case encountered by the endpoint, wherein the event data is received at an API gateway in communication between the client API and at least one user interface gateway;

identifying one or more tasks based on the event data;

providing each task to at least one user client;

receiving, from a respective user interface of each user client, user input associated with each task provided to the at least one user client;

based on the user input, determining a remedial action; and sending the remedial action to the client API to initiate resolution of the edge-case by the intelligent software agent at least partially controlling the endpoint in the environment.

15. The computer program product of claim 14, wherein the at least one user client includes a plurality of user clients, and identifying the one or more tasks based on the event data includes dividing the one or more tasks into a plurality of subtasks executable in parallel to one another across the plurality of user clients.

16. The computer program product of claim 14, wherein providing each task to the at least one user client includes directing a given one of the one or more tasks to a plurality of user clients, and receiving the user input includes receiving a respective user input, based on the given one of the one or more tasks, from each respective user interface of the plurality of user clients.

17. A system comprising:

an endpoint including an intelligent software agent associated with a client application programming interface (API), the intelligent software agent configured to at least partially control the endpoint in an environment;

at least one user client, each user client including a respective user interface; and a server including one or more application programming interface (API) gateways and one or more user interface gateways, each one of the one or more API gateways in communication with the client API associated with the endpoint, each of the one or more user interface gateways in communication with the at least one user client, and the server including one or more processors and one or more non-transitory computer-readable media, the one or more processors in communication with the one or more API gateways and the one or more user interface gateways, and the one or more non-transitory computer-readable media having stored thereon computer executable code executable by the one or more processors to perform operations including:

at the one or more API gateways, receiving event data from the client API, the event data representing an edge-case encountered by the endpoint, identifying one or more tasks based on the event data, from the one or more user interface gateways, providing each task to the at least one user client, at the one or more user interface gateways, receiving, from the respective user interface of the at least one user client, respective user input associated with each task provided to the at least one user client, based on the user input received at the one or more user interface gateways, determining a remedial action, and sending the remedial action from the one or more API gateways to the client API to initiate resolution of the edge-case by the intelligent software agent at least partially controlling the endpoint in the environment, wherein the client API is configured to retry sending the event data if the remedial action is not received at the client API within a predetermined period of time.

18. The system of claim 17, wherein the one or more API gateways includes a plurality of API gateways.

19. The system of claim 18, wherein the plurality of API gateways are in communication with one another according to a fail-operational arrangement.

20. The system of claim 17, wherein each user interface of the one or more user clients is associated with a respective profile of a respective specialist user logged in to a given user client, and wherein providing the each task to the at least one user client comprises: dispatching each task the at least one user client based on the respective profile associated with the respective user interface of the user client.

* * * * *